United States Patent [19]

Sun et al.

[11] Patent Number: 5,335,009
[45] Date of Patent: Aug. 2, 1994

[54] TELEVISION BROADCASTING AND RECEIVING SYSTEMS UTILIZING HYBRID GHOST REFERENCE SIGNALS IN SINGLE FIELD FOR FAST GHOST CANCELLATION

[75] Inventors: Cheng-Yun Sun, Taichung; Chin-Shyung Lo, Taipei, both of Taiwan

[73] Assignee: Industrial Technology Research Institute, Hsinchu, Taiwan

[21] Appl. No.: 921,837

[22] Filed: Jul. 23, 1992

[51] Int. Cl.$^5$ ............................................. H04N 5/21
[52] U.S. Cl. ................................ 348/614; 348/608
[58] Field of Search ................... 358/167, 36, 905; 348/614, 608; H04N 5/21, 7/08

[56] References Cited

U.S. PATENT DOCUMENTS

5,032,916  7/1991  Matsuura et al. ............... 358/905 X
5,060,067 10/1991  Lee et al. ....................... 358/905 X
5,179,444  1/1993  Koo ................................. 358/905 X Primary Examiner—Victor R. Kostak
Attorney, Agent, or Firm—Bo-In Lin

[57] ABSTRACT

The present invention comprises a method for characterizing a multi-path signal transmission in transmitting a plurality of signals with a plurality of cyclic fields each including a plurality of horizontal scanning periods wherein some of the scanning periods are vertical blanking periods. The method comprising the steps of: (a). transmitting periodically in a plurality of the scanning periods in one of the fields at least two reference signals each with a different predefined signal characteristics; (b). receiving the plurality of signals including the reference signals; and (c). processing the received signals including the received signals of reference signals for detecting a multi-path channel delay of the signal transmission.

22 Claims, 12 Drawing Sheets

Fig. 8B (Region #1) − (Region #2)

Fig. 10B (Region #1) − (Region #2)

TELEVISION BROADCASTING AND RECEIVING SYSTEMS UTILIZING HYBRID GHOST REFERENCE SIGNALS IN SINGLE FIELD FOR FAST GHOST CANCELLATION

BACKGROUND OF THE INVENTION

1. Field of the Invention

This invention relates generally to a television broadcasting system and the methods used in detecting multi-channel signal transmission delays resulting in the showing of the undesired ghost images. More particularly, this invention relates to an improved method to detect the fast varying ghost signals with high signal to noise (S/N) ratios whereby high quality TV signals without any undesired images can be generated by expeditiously removing the ghost signals.

2. Description of the Prior Art

The television (TV) broadcast signals are transmitted through multi-path channels to reach the signal receiver disposed on each television set. In either an NTSC or various high definition TV (HDTV) broadcasting environments, ghost images often appear on a TV screen because the signal waves are reflected from different large reflective objects such as hills, buildings, airplanes, and so forth. As the signals are reflected by different objects in this multi-path channel transmission environment, some video signals, if reach the TV receiver with a slightly different reception time, cause ghost image to appear on the screen. Different channel equalization methods are used in an attempt to solve this problem.

For HDTV broadcasting, multi-path channel equalization has become a critical issue. Especially, for a digital high definition television system, the video signals are heavily encoded as digital data. Reliable data recovery at the receiver is important for the video decoder to correctly restore the original picture. However, when data are distorted by the multi-path ghosts, even a weak ghost, the decoder might not be able to decided what data are originally transmitted based on the received signals. This can severely hinder the video decoding process. Therefore, if ghosts are not properly cancelled, broadcasting a heavily compressed digital HDTV signal via a multi-path channel can result in a problem much more serious than a degraded picture image on the TV screen. The received signals when displayed in its video form after decoding could be distorted and become totally incomprehensible to the viewers.

One of the channel equalization methods is to insert, on the transmission side at the time of transmitting the signals, a ghost cancellation reference (GCR) signal to the broadcasting signals. In receiving these signals, a TV receiver determines the multi-path channel delays by measuring the GCR signal and the induced ghosts and then cancels the delays by utilizing a cancellation filer using the delay measurements as input parameters. In order to avoid interfering with the picture signals, a GCR signal is typically inserted in a predetermined horizontal scanning period in a vertical blanking period. However, the detection of the ghost of a GCR is often hindered because a GCR's ghost may superimpose with an immediately preceding or succeeding horizontal synchronization or color burst signals. It imposes a limitation to the range of the multi-path delays to one-half of the horizontal scanning period.

Figure 1:
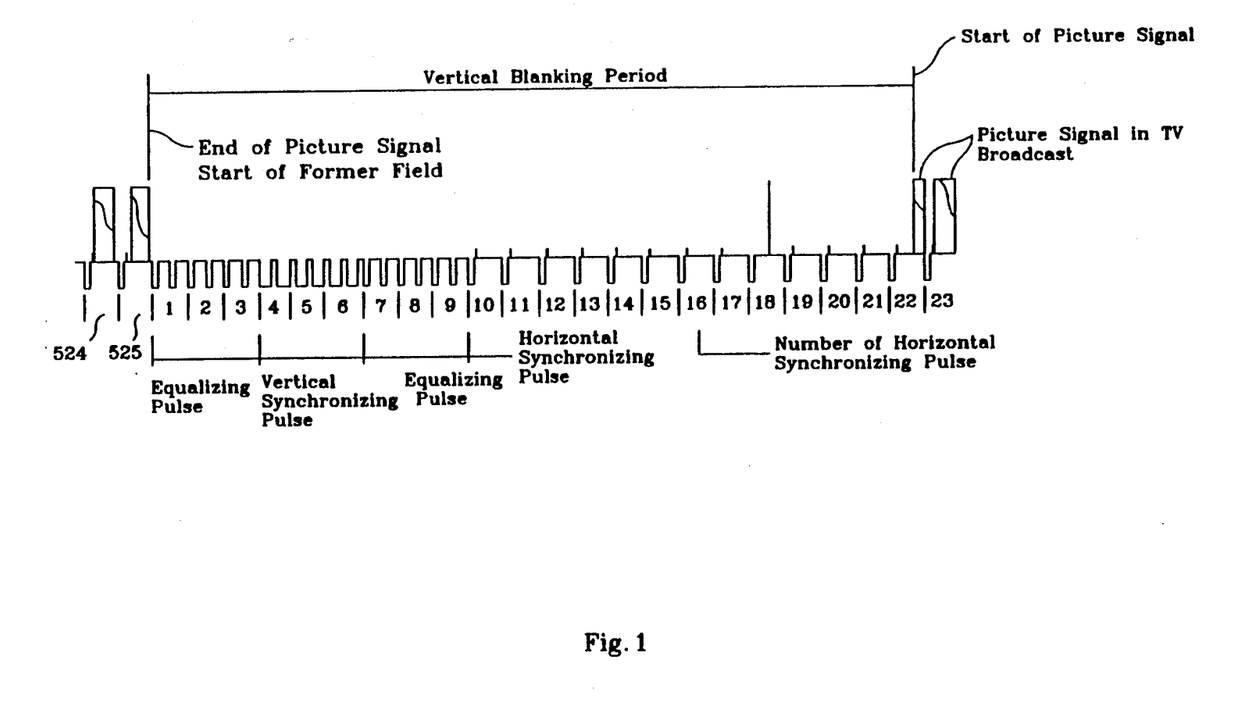
FIG. 1 is a diagram showing the time allocation of a television picture signal with the vertical blanking period.
Figure 2:
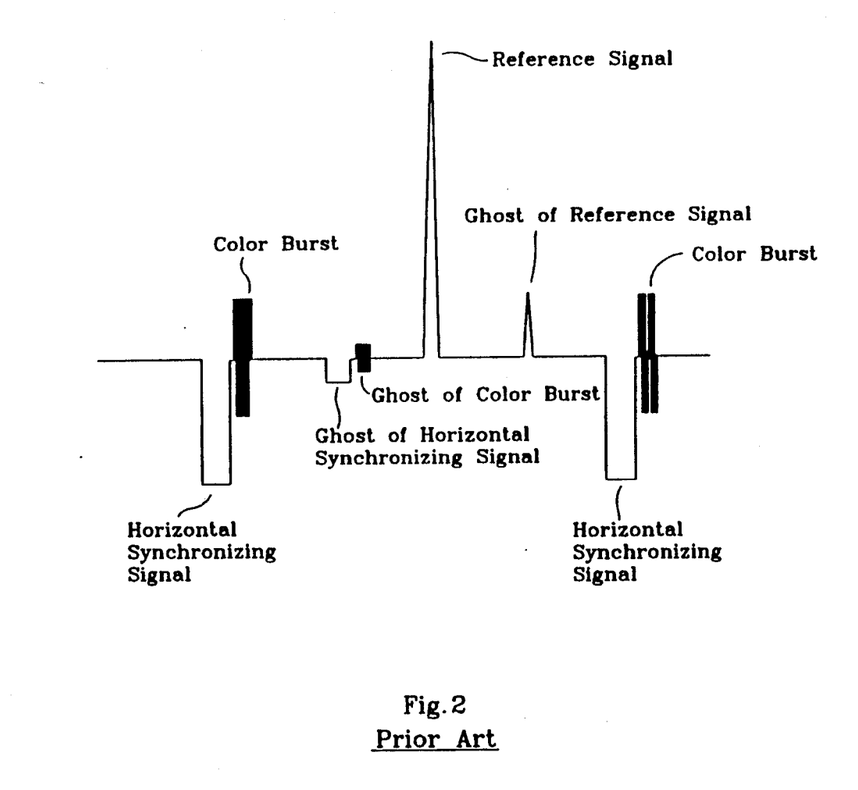
FIG. 2 is a diagram showing an example of a conventional GCR waveform wherein the ghosts of the GCR signal superimpose with other controlling signals.

In an NTSC broadcasting system, the picture signals are propagated in cyclic frames at a rate of approximately thirty frames per second. Each frame has five hundred and twenty-five scanning lines where almost every line is allocated a time slot of one horizontal scanning period. Each horizontal scanning period therefore has a duration of approximately 63.5 micro seconds. Each frame is also divided into two fields, an even field and an odd field. As shown in FIG. 1, at the beginning of each field, there is a vertical blanking period, or interval, comprising a plurality of horizontal scanning period. The signals transmitted in the vertical blanking period are regular controlling and testing signals for indication of the beginning of a new field and for various control, synchronization and testing purposes. These signals as the name, i.e., vertical blanking interval, implies are not shown on a TV screen while the picture signals that follow right after are video signals for display. For the purpose of ghost cancellation, the GCR signals are typically inserted in the vertical blanking period generally between the horizontal periods ten to twenty-one. As shown in FIG. 2, when the delay of a ghost is longer than half of the horizontal scanning period, i.e., longer than 32 micro seconds, the ghost of a GCR signal may superimpose with either a horizontal synchronizing signal or a color burst and thus becomes undistinguishable and useless for the ghost delay measurement.

Figures 3, 3C:
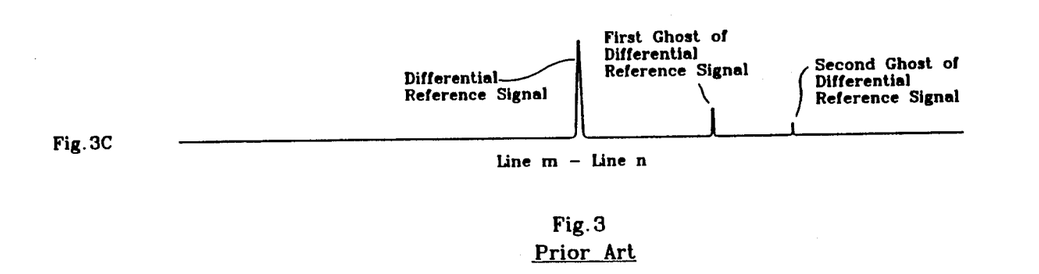
FIGS. 3A to 3C are diagrams showing an example of the operational waveforms processed by a ghost canceller according to the prior art.
Figure 3A:
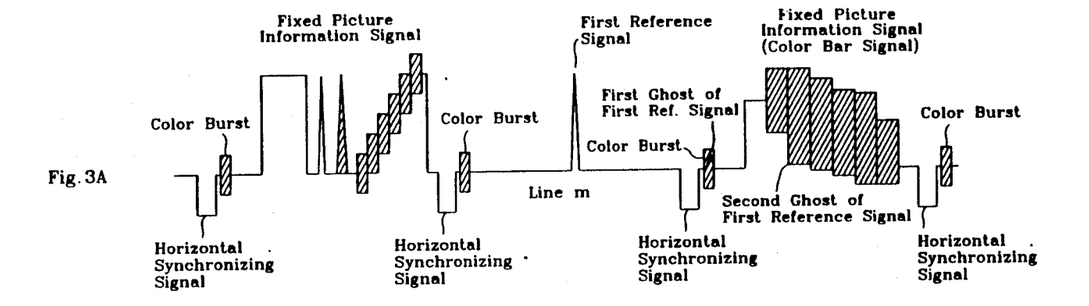
Figure 3B:
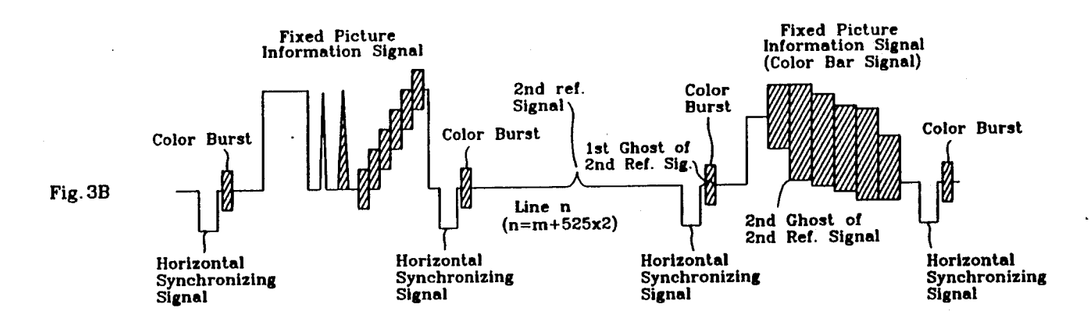

In order to overcome this difficulty, Matsuura et. al in U.S. Pat. No. 5,032,916 entitled "Method of Detecting Signal Waveform Disturbance in Received Television Picture Signal" (issued on Jun. 16, 1991) discloses a method of detecting the signal waveform disturbances by inserting a one or more pairs of GCR signals. Each pair includes two GCR signals of different waveforms and are inserted in the two predetermined horizontal scanning periods separated by at least one field period. These two predetermined horizontal scanning periods are corresponding horizontal scanning periods wherein they are separated by a constant interval or an integral multiplication of an interval of periodicity with the consideration that the television picture signals are transmitted with each field repeated with a constant interval of periodicity. A differential waveform is then obtained by subtracting the signals of one field from that of the corresponding field inserted with the corresponding GCR signal. As the controlling signals and the picture signals are identical and being cancelled out between these corresponding fields, the differential waveform comprises only the difference of the inserted GCR signals and their ghosts. A specific example where a pair of GCR signals inserted in two corresponding horizontal scanning periods separated by two frames, i.e., two times five-hundred-and-fifty-two scanning periods, is shown in FIG. 3A and 3B and the differential waveform obtained by subtracting one signal from the other is shown in FIG. 3C.

Figure 4:
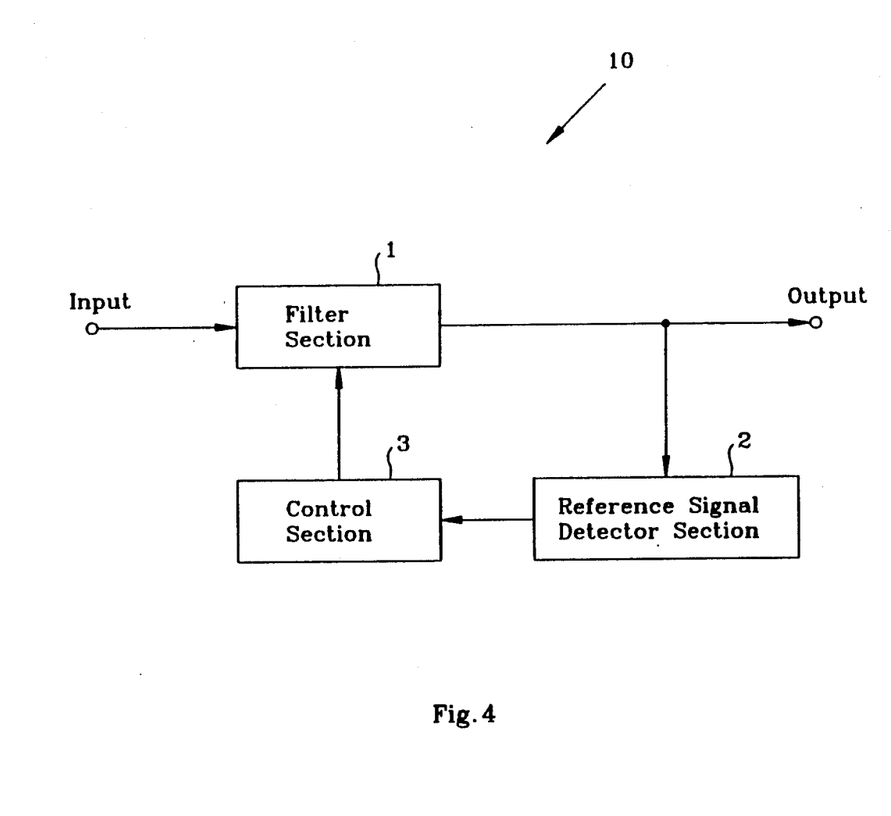
FIG. 4 is a block diagram showing an outlined structure of a ghost canceller.

FIG. 4 shows a schematic block diagram of a ghost cancelling apparatus 10 which is capable of performing the aforementioned ghost cancelling operations. It is generally also referred to as ghost canceller or reducer. The ghost cancelling apparatus 10 comprises a filter section 1 for cancelling actual ghost component in a received picture signal by generating appropriate ghost of a picture signal concerned. A reference signal detector section 2 detects a GCR signal and ghost components thereof in an output signal of the filter section 1. The reference signal detector section 2 further detects the amplitudes, delay times and other relevant waveform characteristics of the ghost components. The ghost cancelling apparatus 10 further comprises a controlling section 3 for controlling the filtering property of the detector section 2 to facilitate the cancellation of the actual ghost components.

Figure 5:
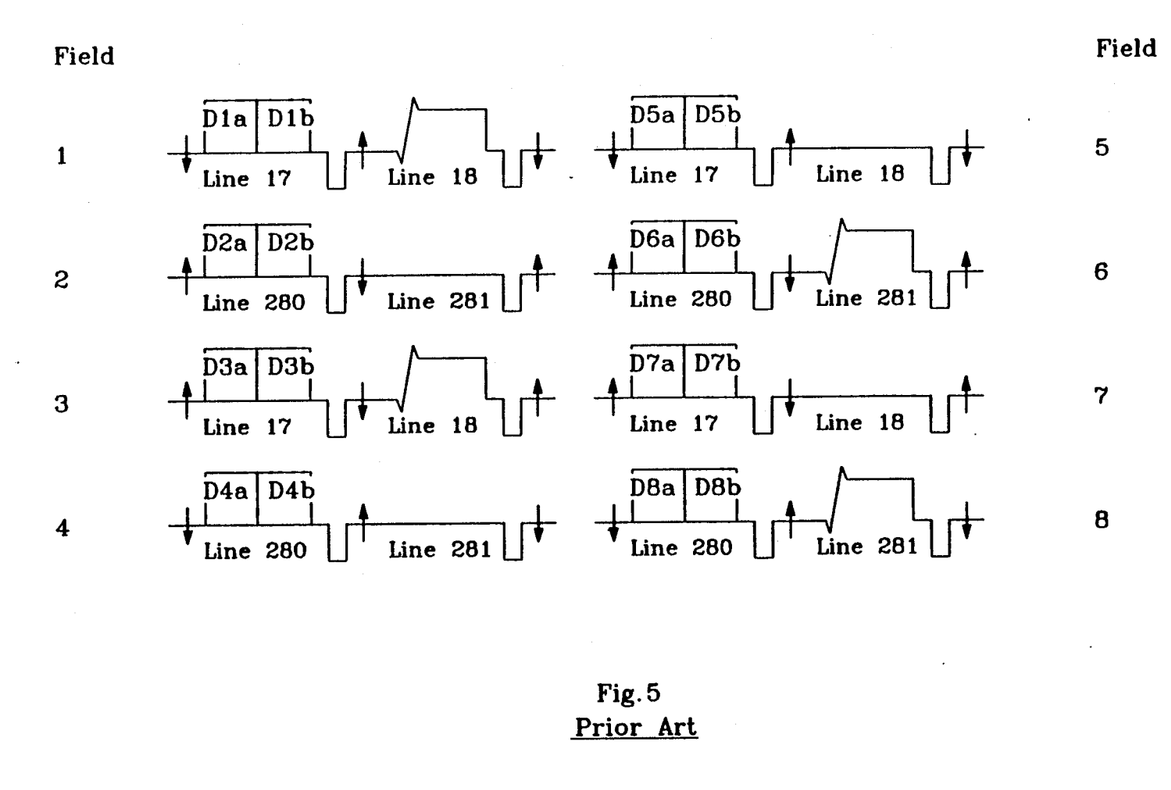
FIG. 5 shows the waveforms in an eight-sequence field for a BTA ghost cancellation scheme.

The ghost elimination technique as disclosed by Matsuura et al. includes an eight-field sequence method is adopted by the Broadcasting Technology Association (BTA) in Japan. Since the phase of an NTSC colored picture signal is cyclically varied at a period of four fields, i.e., at four-field interval, the picture signal has just the same waveform, level, and phase; four pairs of GCR signals are added to the transmission in the BTA's eight-field sequence. Therefore, the GCR signals, inserted in frame lines 18 and 281 within the vertical blanking interval in FIG. 5, are then transmitted in an eight-field sequence. A ghost canceller is employed which utilizes a transversal filter to minimize the video image error by use of a reference GCR signal computed by:

$$GCR = \frac{1}{4}\{(S_1-S_5)+(S_6-S_2)+(S_3-S_7)+(S_8-S_4)\} \quad (1).$$

Where $S_1, S_2, \ldots S_8$ represent the waveform of the GCR signal in the first, second, ..., eighth fields, respectively.

While the ghost reduction technique as disclosed by Matsuura et al. and adopted by BTA is able to solve the problem that the GCR signals may superimpose with other controlling signals when the multi-path channel delays are longer than half of the horizontal scanning period, it however has several technical limitations. Specifically, since the ghost elimination is performed with GCR measurements over a duration of several frames, Matsuura's channel equalization method is not very effective under the conditions when there is a fast variation of ghost images. These fast varying ghost conditions are more prevalent under the circumstances when there are people moving around in the room, swaying of trees, passing by of vehicles or airplanes, etc. The BTA ghost canceller is generally not able to adequately keep track of these conditions. Additionally, by inserting the GCR signals over several fields, Matsuura's method relies on an accurate count of horizontal synchronous pulses to determine the GCR signal insertion positions. Under a strong ghosting condition when a strong leading ghost signal superimposes with a preceding horizontal synchronous pulse, a ghost canceller may lose accurate count of the synchronization signals which renders the canceller unable to acquire a GCR signal.

Figure 6:
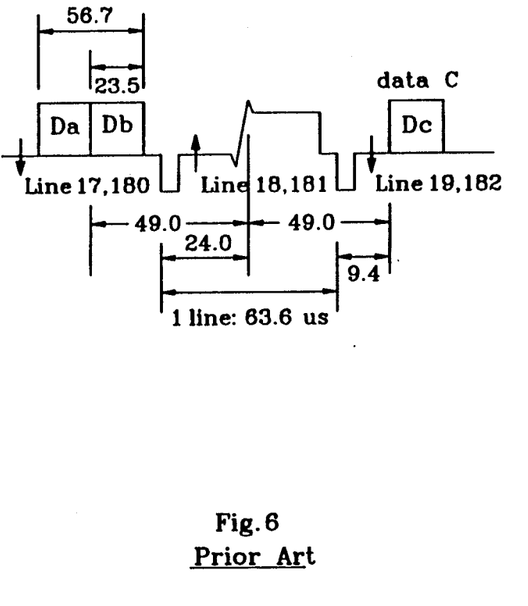
FIG. 6 shows the time allocation to prevent ghost interference in three consecutive scanning periods in a BTA ghost cancellation scheme.

Furthermore, for each field there are only limited number of horizontal scanning periods in the vertical blanking period while there are many different types of synchronization, testing and other types of coded signals to be transmitted through these lines; the use of these scanning lines must be carefully evaluated. In BTA's channel equalization method, as that shown in FIG. 5, the GCR signals may be interfered by the signals at line 17 and line 280 if these GCR signals have a long post ghost. In order to accurately characterize the long transmission channels, the interference of these long post ghost must be eliminated in applying Equation (1) to compute the differentiated waveform. To obtain pure differentiate GCR, the signals in lines 17 and 280 must be arranged such that they cancel each other, i.e., $D_{1B}=D_{5B}$, $D_{2B}=D_{3B}$, $D_{4B}=D_{7B}$, and $D_{4B}=D_{8B}$. The use of these horizontal scanning periods are therefore constrained. More specifically, since the GCR signal is an integrated sine function, in order to assure that there is no interference between the GCR signals and all the pre-ghosts of the signals in lines 19 or 281 and the post-ghosts of signals in lines 17 or 280, the length and relative positions of the signals in these scanning periods are also constrained. Referring to FIG. 6, since the ghost of a signal can occur anywhere between minus four to forty-five micro seconds from the signal itself, in order to avoid interference of any preghost of $D_c$ with any post ghost on the edge of the integrated sine function, the integrated sine function must be placed at 24.0 micro seconds from the previous edge of the negative rectangular function of lines 18 and 181. The front edge of $D_b$ in the pair-wise region is 49.0 micro seconds ahead of the front edge of the integrated sine function and the minimum length of signal $D_b$ is 23.5 micro seconds. The use of three scanning lines are actually involved in the BTA's method even though there is only one GCR signal used in each field. The efficiency of using scanning period in the vertical blanking intervals in this case is therefore one channel equalization operation per every twenty-four ($3 \times 8$) scanning lines. There is a need in the art to increase the efficiency of using scanning period in the vertical blanking period.

Additionally, the BTA system is also limited by the difficulties of a low signal to noise ratio. The BTA system utilizes a time truncated $(\sin x)/x$ GCR signal with a frequency around 4.2 MHz, which is then bandwidth integrated over 44.7 micro seconds and terminated by a 2 T trailing edge. The paired GCR signals are then interleaved four times in an eight-field sequence. Conceptually, this GCR signal can be viewed as $(\sin x)/x/(1-D)$, where $1/(1-D)$ is a discrete integration operation at a sampling rate of four times the frequency of the color subcarrier at approximately 14.32 MHz. At the receiver, the integrated $(\sin x)/x$ signal is differentiated by a $(1-D)$ one-clock difference operation which also provides a DC blocking function in order to eliminate possible DC bias in the system. To avoid possible linear distortions, the peak amplitude of the integrated $(\sin x)/x$ GCR signal is limited to about 75 IRE. The amplitude of the $(\sin x)/x$ signal before integration is limited to less than half of the peak value, i.e., 38 IRE, since the amplitude of the original $(\sin x)/x$ signal is about half the amplitude of the integrated GCR signal. This causes a six dB loss in the signal to noise (S/N) ratio. At the receiver, the differential operation which restores the $(\sin x)/x$ signal to regain three dB in S/N ratio while approximately a nine dB loss is caused by the elimination of DC bias. In order to improve the S/N ratio, the received GCR signal are averaged over hundreds of fields before it is actually used. A BTA proposal recommends an average of about five seconds, i.e., thirty-two times over eight-field sequence, to achieve a fifteen dB improvement in the S/N ratio. This further slows down system convergence and causes more difficulties in tracking the fast varying ghosts.

Therefore, for those skilled in the art, there is still a need for a new and improved channel equalization method. Specifically, this channel equalization method should be able to detect the GCR signals and the associated ghosts in the fast varying ghost conditions without relying on accurate count of horizontal synchronization signals. Also, the waveforms of the GCR signals must be properly designed whereby a high S/N ratio can be obtained without requiring averaging over many frames such that fast system convergence can be achieved.

In order to meet many specific requirements of a high quality GCR signal including the requirement of a high S/N ratio, two types of GCR signals are proposed, namely a pseudo-random noise (PN) sequence and chirp GCR signals.

A modified pseudo-random noise sequence as proposed by Wang et al. is used to improve the signal to noise ratios. In "Training Signal and Receiver Design for Multi-path Channel Characterization for TV Broadcasting" (IEEE Transaction on Consumer Electronics, Vol. 36, No. 4 November 1990, PP 794-806), a GCR waveform utilizing a modified pseudo-random noise (PN) sequence and a corresponding correlator for signal detection is proposed by Wang et al. to provide better noise rejection for use in the ghost cancellation scheme. The S/N ratio is improved because the use of a correlator to correlate a PN sequence results in large peaks separated by 'quiet zones' of samples with low amplitudes. Wang et al. further modify the PN sequence by amplifying its DC component by a factor of N where N is the total number of the spectrum sequence. A bias constant of one is yielded which simplifies the design of the correlator such that the correlation operations involve only additions and subtractions. Wang et al. therefore disclose a very cost-effective way to implement the modified PN sequence GCR signals for channel identification which provides better and higher value of S/N ratios without requiring long term averaging.

The modified PN sequence signals however has several disadvantages due to the facts that it does not have a flat magnitude spectrum over the entire frequency range for GCR signal transmission and that it has a noisy linear correlation function. A mathematically synthesized GCR signal, i.e., chirp function, is disclosed by Koo in "Developing a New Class of High Energy Ghost Cancellation Reference Signals" (IEEE, 1992) for generating a signal with flat spectrum. The chirp function is a summation of products of Bessel functions and time domain functions where the time domain function is an integration of a series of periodic functions over the entire band of frequency. Chirp signals therefore have a flat spectrum and high signal energy. However, in order to implement chirp signals, a correlator must perform multiplications and summations and the sampling of the signals must be performed from low frequency to high frequency domain. Although as pointed out by Koo that the chirp signals provide accurate channel characterization because of its flat spectrum and high signal energy, the chirp function is however more expensive to implemented as a GCR signal in comparison to the modified PN sequence as proposed by Wang et al.

The choice between a modified PN sequence and chirp function as the GCR signals for channel equalization also presents a challenge to the broadcasting industry. There are various types of TV signal receivers each may have different signal quality requirements. Depending on the price of the TV set, it may be desirable to broadcast TV picture signals which would allow options to use different kinds of ghost cancellation schemes with different levels of complexity and sophistication. This flexibility requirement will become more important as the digital HDTV becomes more commercially available and popularly used. The ability to transmit a single type of signals to satisfy different levels of picture quality requirements for a wide variety of receiver capabilities with different ghost canceling schemes is also a need in the TV broadcasting art.

SUMMARY OF THE PRESENT INVENTION

It is therefore an object of the present invention to provide an channel equalization system and method for effective ghost cancellation in a fast-varying ghost condition.

Another object of the present invention is to provide a ghost cancellation method wherein the GCR signals are inserted and detected in the received television picture signals within a period of one field whereby the ghost cancellation is not dependent on accurate count of the horizontal synchronization signals over a long time period.

Another object of the present invention is to provide a ghost cancellation method which allows the flexibility for the signal receivers to implement different ghost cancellation algorithms to satisfy different levels of picture quality requirements without requiring the receiver to receive different types of broadcasting signals.

Another object of the present invention is to provide a ghost cancellation method which can be easily implemented in a ghost cancellation filter with simple hardware logic designs in an integrated circuit whereby the cancellation filter can be economically manufactured and conveniently installed onto a TV receiver.

Another object of the present invention is to provide a ghost cancellation method wherein the scanning lines in the vertical blanking period are effectively utilized.

Briefly, in a preferred embodiment, the present invention comprises a method for characterizing a multi-path signal transmission in transmitting a plurality of signals with a plurality of cyclic fields each including a plurality of horizontal scanning periods wherein some of the scanning periods are vertical blanking periods. The method comprising the steps of: (a) transmitting periodically in a plurality of the scanning periods in one of the fields at least two reference signals each with a different predefined signal characteristics; (b) receiving the plurality of signals including the reference signals; and (c) processing the received signals including the received signals of reference signals for detecting a multi-path channel delay of signal transmission.

One advantage of the present invention is that it provides an channel equalization system and method for effective ghost cancellation in a fast varying ghost condition.

Another advantage of the present invention is that it provides a ghost cancellation method wherein the GCR signals are inserted and detected in the received television picture signals within a period of one field whereby the ghost cancellation is not dependent on accurate count of horizontal synchronization signals over a long time period.

Another advantage of the present invention is that it provides a jitter robust GCR signal for the ghost canceller, especially when the horizontal synchronization signals are distorted by the interference of ghosts.

Another advantage of the present invention is that it provides the least remaining color burst after the subtraction of a pair of GCR signals whereby the far post-ghost weighting coefficients can be accurately calculated when a PN sequence and/or a chirp signal are used.

Another advantage of the present invention is that it provides a ghost cancellation method which allows the flexibility for the signal receivers to implement different ghost cancellation algorithms to satisfy different levels of picture quality requirements without requiring the receivers to receive different types of broadcasting signals.

Another advantage of the present invention is that it provides a digital timing recovery method which can be easily implemented in a real-time correlator with simple hardware logic designs as an integrated circuit whereby the timing recovery circuit can be economically manufactured and conveniently installed onto a TV receiver.

Another advantage of the present invention is that it provides a ghost cancellation method wherein the scanning lines in the vertical blanking period are effectively utilized.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Detailed description of the preferred embodiment of the present invention is provided in this section by referring to the drawings principally relating to the waveforms of different types of GCR signals. The corresponding operation of a ghost calcellation apparatus disposed on a television signal receiver and their operation and performance are well known in the art. The apparatus 10 as shown in FIG. 4 is one example of a ghost cancelling apparatus which may be suitable for use in the preferred embodiment of the present invention.

Figure 7:
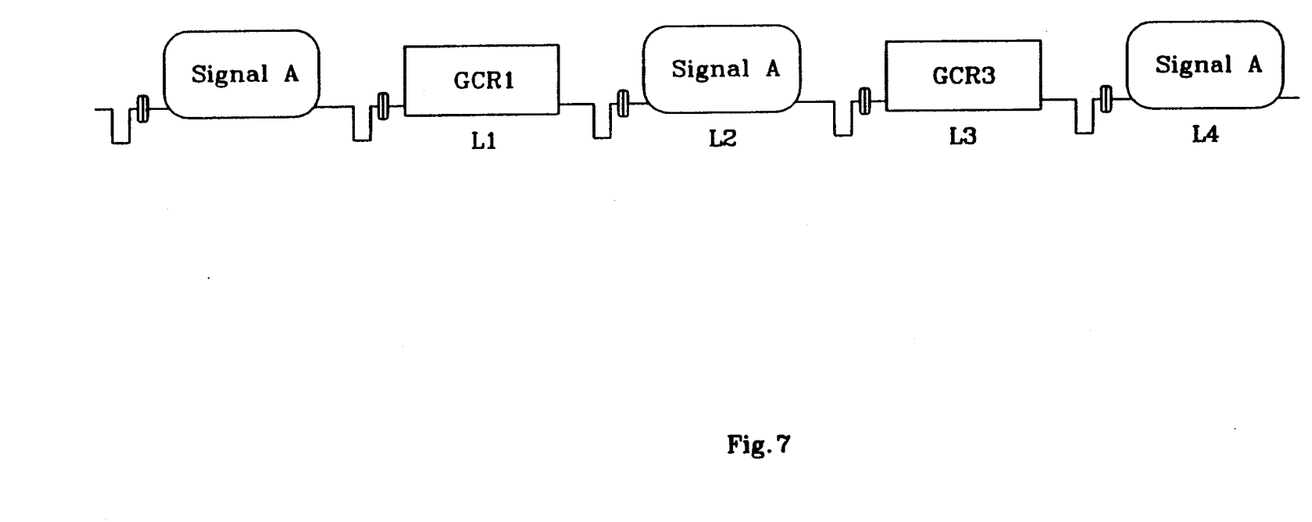
FIG. 7 is a waveform diagram showing the insertion of the GCR signals in four consecutive horizontal scanning periods according to the present invention.

FIG. 7 shows a waveform of a TV broadcasting signals according to the present invention wherein signals received from four consecutive horizontal scanning periods in the vertical blanking interval are processed by a ghost cancelling apparatus. These four consecutive scanning periods are denoted by L1, L2, L3 and L4 wherein GCR signals in the form of either modified PN sequence or chirp function are inserted in L1 and L3.

Figure 8A:
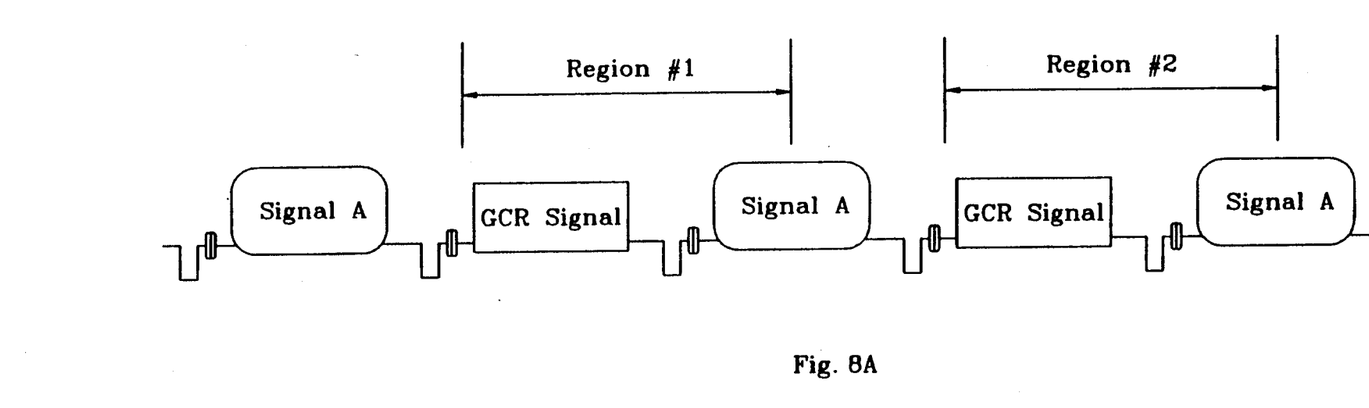
FIGS. 8A and 8B show the waveforms as received and processed by a TV receiver utilizing the GCR signals of FIG. 7.
Figure 8B:
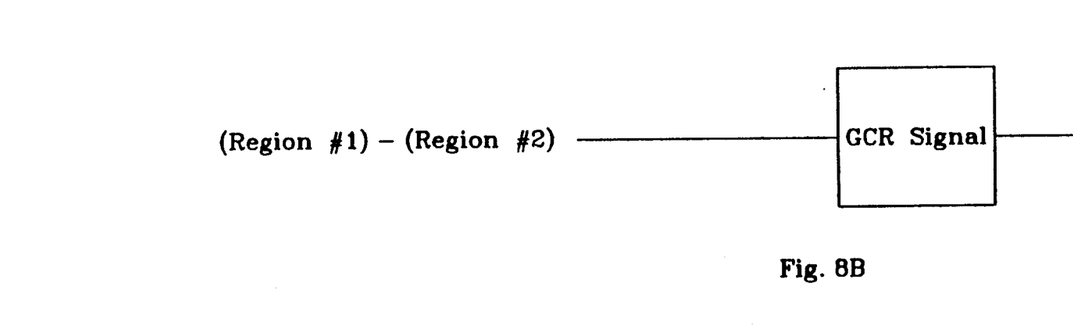

FIGS. 8A shows the waveform of the picture signals received by a TV receiver in the horizontal scanning periods L1, L2, and L3, L4 corresponding to the transmitting waveform of FIG. 7. FIG. 8B is the waveform obtained by subtracting signals in L3 and L4 from that in L1 and L2. In the subtraction operation, the horizontal synchronizing signals and the color bursts between these horizontal scanning periods are all cancelled out. The differential waveform remained after the subtraction is the difference of the GCR signals and their associated ghosts. The ghost components as measured can be exactly and readily detected.

Figure 9:
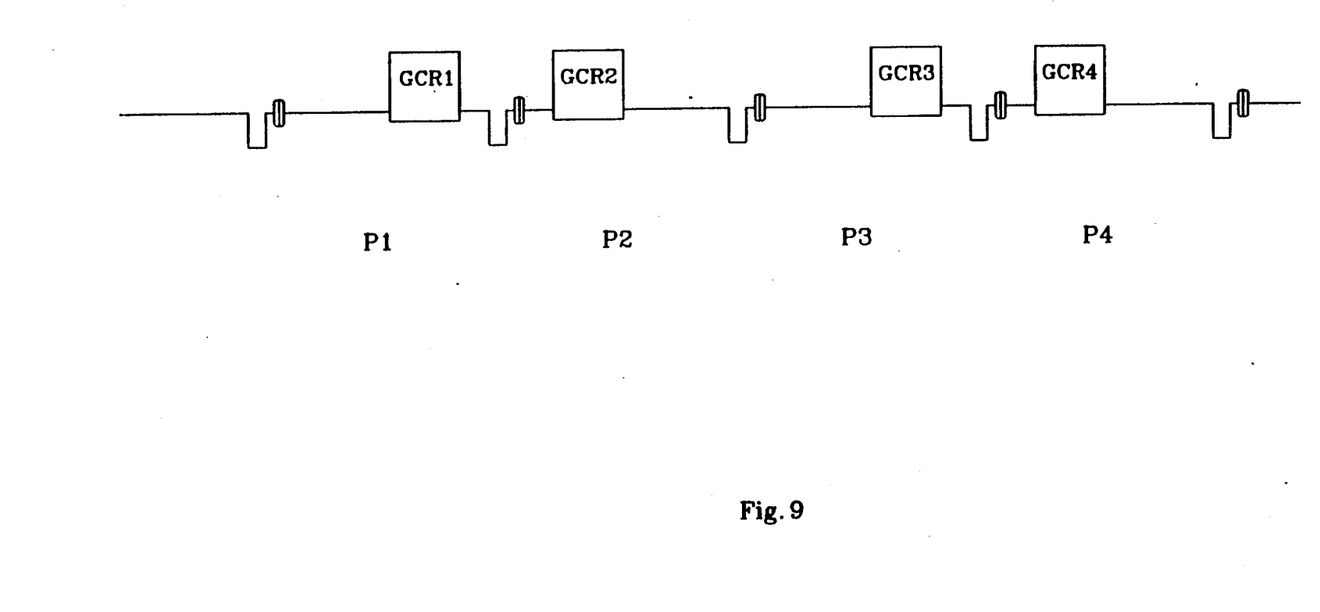
FIG. 9 is another waveform diagram showing the insertion of the GCR signals in five consecutive horizontal scanning periods according to the present invention.
Figure 10A:
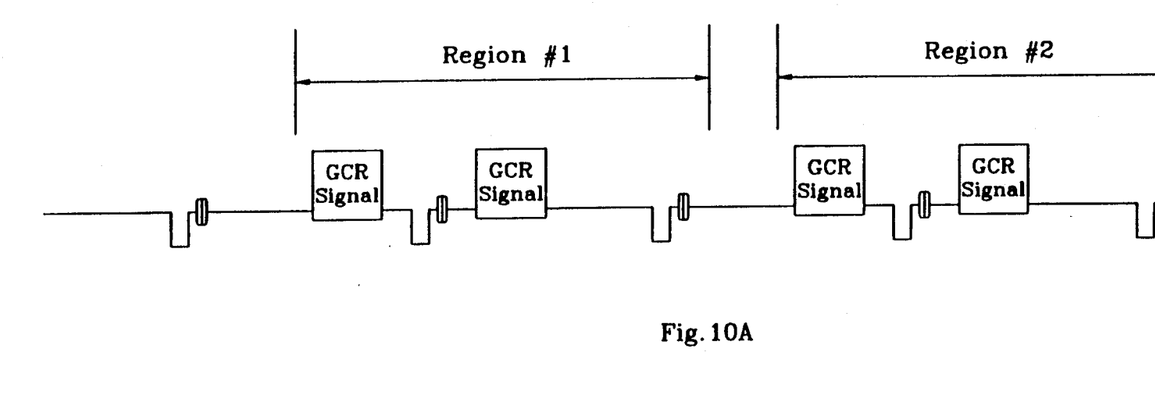
FIGS. 10A and 10B show the waveforms as received and processed by a TV receiver utilizing the GCR signals of FIG. 9.
Figure 10B:
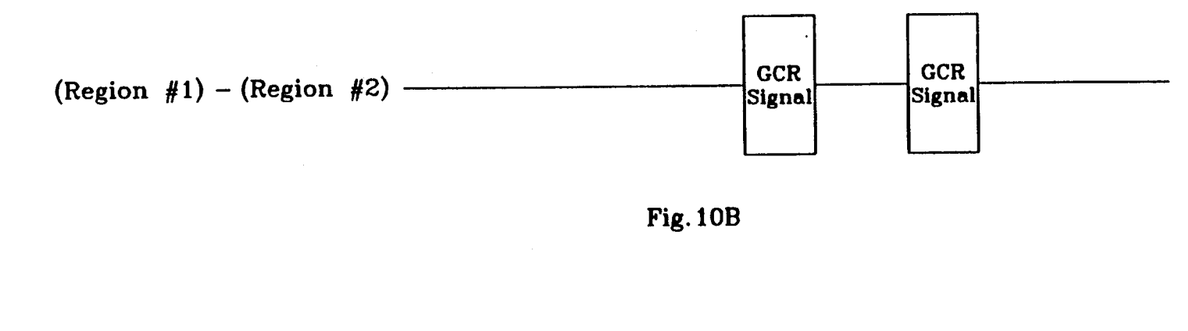

FIG. 9 shows an alternative waveform wherein two sets of modified PN sequences or chirp signals are added to four consecutive horizontal scanning periods denoted by P1, P2, P3, and P4. The GCR signals in P1 and P3 are added to the later part of the scanning period such that the ghosts of these two GCR signals are most likely to occur in the scanning periods of P2 and P4 respectively. While the GCR signals in P2 and P4 are placed in the early part of the the respective periods to assure that the ghost signals will occur in the same scanning period. As a scanning period covers a time duration of approximately 64 microseconds and that more than ninety percent of the ghosts are within minus four to twenty-six micro seconds and almost always range between minus four to thirty-seven micro seconds, it is anticipated that by processing these four consecutive scanning periods as that shown in FIGS. 10A to 10B, channel delays can be exactly measured. FIG. 10B shows the correlator outputs of the received signals corresponding to the transmitted signals P1 and P2, and P3 and P4, respectively. The waveform in FIG. 10C is the resultant signal obtained by subtracting the waveform of region 2 from that of region 1. Again, all the controlling signals are cancelled through the subtraction operation; only the differences of the GCR signals and the ghost components of these GCR signals remain.

Figure 11:
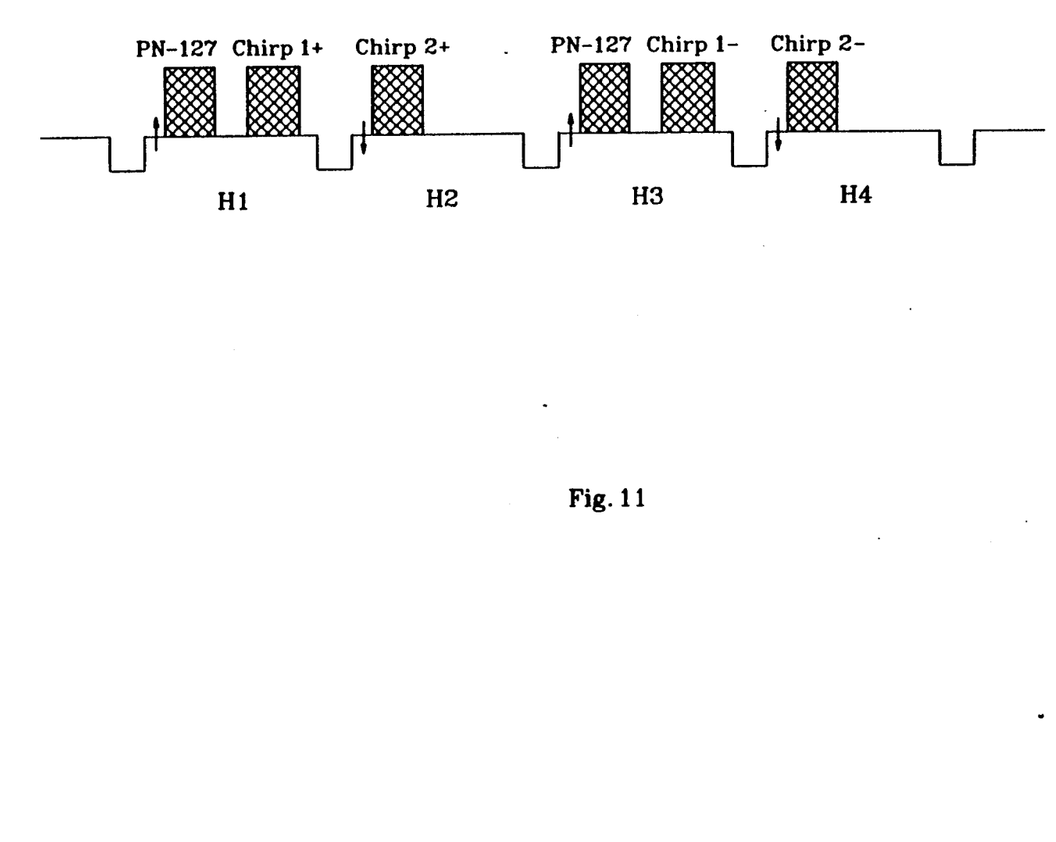
FIG. 11 shows the waveforms of a GCR cancellation scheme utilizing hybrid signals.

FIG. 11 shows another alternate embodiment of the present invention. Four consecutive scanning periods, denoted by H1, H2, H3 and H4, in the vertical blanking periods are inserted with 'hybrid' GCR signals. The early portion of periods H1 and H3 are inserted with PN-127 sequence and the later portion of H1 and H4 are inserted with positive and negative chirp signals respectively. A second chirp signal is then inserted in H2 and H4 where the chirp signals in H1 and H3 with a spectrum ranging from low to medium frequencies complementary to those in H2 and H4 with a spectrum ranging from high to medium spectrum to form a complete chirp signal. The high frequency is approximately 4.2 MHz, the low frequency is near zero and the medium frequency is the average of the the high and the low frequencies. At the receiving end, a receiver has the flexibility to process either the PN sequence or the chirp signal by either adding or subtracting signals in H1 and H2 from those in H3 and H4 respectively. Depending on the type of receiver, options are provided through the use of these hybrid GCR signals to allow a TV user to apply different ghost cancellation techniques.

Figure 12:
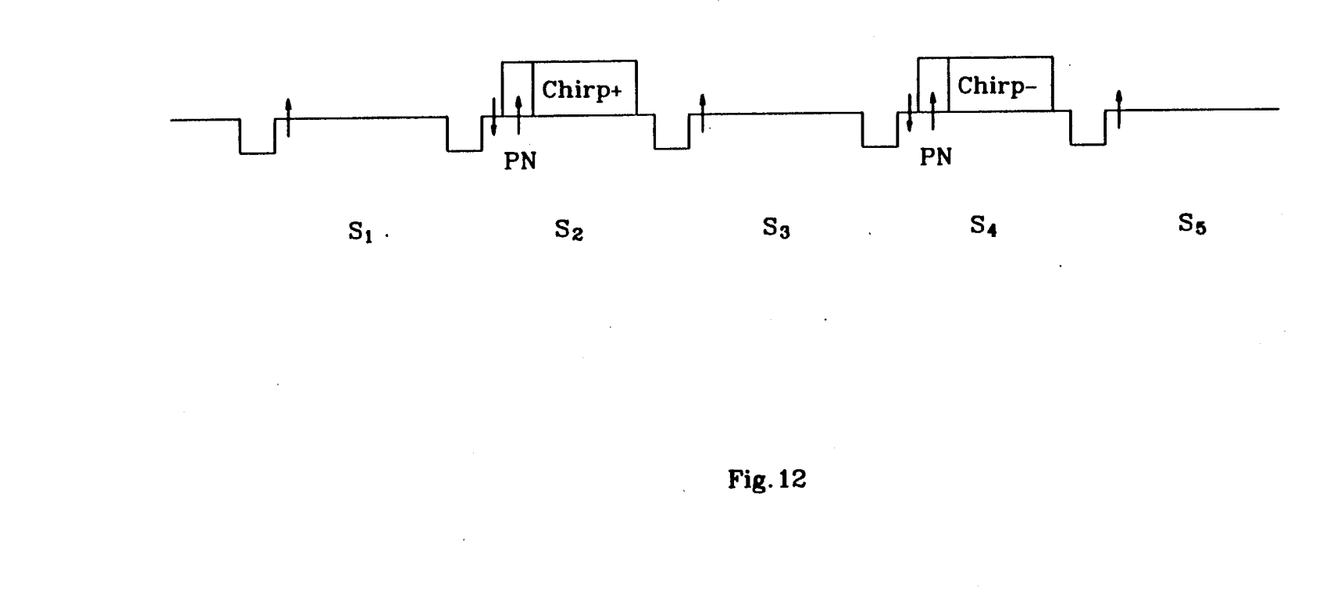
FIG. 12 shows the alternate waveforms of a GCR signal cancellation scheme utilizing a different set of hybrid signals.

Another type of hybrid GCR signal is shown in FIG. 12 where five consecutive scanning lines denoted by $S_1$ to $S_5$ are used with the hybrid GCR signals inserted in $S_2$ and $S_4$. The early portion of $S_1$ and $S_4$ are inserted with PN-31 or PN-63 signals while the later portion are inserted with a positive and a negative chirp signal respectively. The three other scanning lines $S_1$, $S_3$ and $S_5$ are inserted with totally identical signals. Similarly, at the receiving end, a receiver has the flexibility to process either the PN sequence or the chirp signal by either adding or subtracting signals in $S_1$ and $S_2$ from those in $S_3$ and $S_4$ respectively. Depending on the type of receiver, options are provided through the use of these hybrid GCR signals to allow a TV user to apply different ghost cancellation techniques.

Therefore, according to the present invention, as the GCR signals are inserted in the pre-designated horizontal scanning periods within the same field, the channel transmission delays can be measured utilizing the signals received which are transmitted in a time period in most cases less than 200 micro seconds. Thus, it enables the detection and correction of a fast varying ghost images immediately after the reception of the signals in a few consecutive scanning periods. The S/N ratios are also improved by utilizing the modified PN sequence in combination with a low cost correlator installed on a TV receiver. The present invention teaches a simple but effective technique which is conveniently implementable to overcome the difficulties as encountered in the prior art.

Although the present invention has been described in terms of the aforementioned preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for characterizing a multi-path signal transmission in transmitting a plurality of signals divided into a plurality of cyclic fields each including field synchronization signals and a vertical blanking period which further includes a plurality of horizontal scanning periods wherein said method comprising the steps of:
   (a) transmitting periodically within a single vertical blanking period for one of said plurality of cyclic fields at least two reference signals each with a different predefined signal characteristic wherein each of said reference signals being transmitted in a different time duration defined by said horizontal scanning periods;
   (b) receiving said plurality of signals including said reference signals in said different horizontal blanking periods within said single vertical blanking period; and
   (c) processing said received signals including said reference signals in said different horizontal blanking periods within said single vertical blanking period for detecting a multi-path channel delay of said signal transmission.

2. The method for characterizing a multi-path signal transmission of claim 1 wherein:
   step (a) further comprises a step of transmitting said reference signals wherein each of said reference signals is a pseudo-random noise (PN) signal.

3. The method for characterizing a multi-path signal transmission of claim 1 wherein:
   step (a) further comprises a step of transmitting said reference signals wherein each of said reference signals is a chirp signal.

4. The method for characterizing a multi-path signal transmission of claim 1 wherein:
   step (a) further comprise a step of transmitting said reference signals wherein each of said reference signals is a hybrid signal including a modified PN sequence signal and a chirp signal.

5. A method for characterizing a multi-path signal transmission in transmitting a plurality of signals divided into a plurality of cyclic fields each including field synchronization signals and a vertical blanking period which further includes a plurality of horizontal scanning periods wherein said method comprising the steps of:
   (a) transmitting periodically within a single vertical blanking period for one of said plurality of cyclic fields at least two reference signals each with a different predefined signal characteristic wherein each of said reference signals being transmitted in a different time duration defined by said horizontal scanning periods and one of said reference signals being a first reference signal and a different one of said reference signals being a second reference signals;
   (b) receiving said plurality of signals including said first and second reference signals in said different horizontal blanking periods within said single vertical blanking period; and
   (c) processing said received signals including said first and said second reference signals in said different horizontal blanking periods within said single vertical blanking period for detecting a multi-path channel delay of said signal transmission.

6. The method for characterizing a multi-path signal transmission of claim 5 wherein:
   step (a) further comprises a step of transmitting said first and said second reference signals as a first hybrid signal and a second hybrid signal respectively in said single vertical blanking interval wherein each of said hybrid signals includes a PN sequence signal and a chirp signal.

7. The method for characterizing a multi-path signal transmission of claim 5 wherein:
   step (a) further comprises a step of transmitting in one of said horizontal scanning period right before and after said first reference signal a first and a second pair-wise signal;
   step (a) further comprises a step of transmitting said second reference signal in one of said horizontal scanning period right after said second pair-wise signal and transmitting a third pair-wise signal in one of said horizontal scanning period right after said second reference signal wherein said first, second and third pair-wise signals have identical signal characteristic; and
   step (c) further comprises a step of subtracting said received signal of said second reference signal from that of said first reference signal and said received signal of said third pair-wise signal from said second pair-wise signal.

8. The method for characterizing a multi-path signal transmission of claim 7 wherein:
step (a) further comprises a step of transmitting said first reference signal in one of said horizontal scanning periods between 12 and 18 scanning periods in said vertical blank scanning periods.

9. The method for characterizing a multi-path signal transmission of claim 8 wherein:
step (a) further comprises a step of transmitting said first reference signal in the center of said horizontal scanning periods for said first reference signal wherein the length of said reference signal is less than 33.2 micro seconds; and
step (a) further comprises a step of transmitting said second reference signal in the center of said horizontal scanning periods for said second reference signal wherein the length of said reference signal is less than 33.2 micro seconds.

10. The method for characterizing a multi-path signal transmission of claim 9 wherein:
step (a) further comprises a step of transmitting said first reference signal and said second reference signal wherein said first and said second reference signals are a modified pseudo-random noise (PN) signal.

11. The method for characterizing a multi-path signal transmission of claim 9 herein:
step (a) further comprise a step of transmitting said first reference signal and said second reference signal wherein said first and said second reference signals are a chirp signal.

12. The method for characterizing a multi-path signal transmission of claim 11 wherein:
step (a) further comprise a step of transmitting said first reference signal and said second reference signal wherein said first and said second reference signals are a hybrid signal including a modified PN sequence signal and a chirp signal.

13. The method for characterizing a multi-path signal transmission of claim 9 wherein:
step (a) further comprise a step of transmitting said first reference signal including a first PN sequence signal and a first chirp signal, and said second reference signal including a second PN sequence signal identical with said first PN sequence signal and a second chirp signal identical with said first chirp sequence but has a substantially one-hundred-eighty degree phase difference.

14. A method for characterizing a multi-path signal transmission in transmitting a plurality of signals with a plurality of cyclic fields each including a plurality of horizontal scanning periods wherein some of said scanning periods being vertical blanking periods; said method comprising the steps of:
(a) transmitting periodically in four consecutive periods of said horizontal scanning periods in one of said fields a first, second, third, and fourth reference signals each with a different predefined signal characteristic;
(b) receiving said plurality of signals including said four reference signals; and
(c) processing said received signals including said received signals of said four reference signals for detecting a multi-path channel delay of said signal transmission.

15. The method for characterizing a multi-path signal transmission of claim 14 wherein:
step (a) further comprises a step of transmitting said four reference signal in said vertical blanking interval.

16. The method for characterizing a multi-path signal transmission of claim 15 wherein:
step (a) further comprises a step of transmitting said first reference signal in one of said horizontal scanning periods between 12 and 18 scanning periods in said vertical blank scanning periods.

17. The method for characterizing a multi-path signal transmission of claim 16 wherein:
step (a) further comprises a step of transmitting said four reference signals wherein each of said reference signals is either a pseudo-random noise (PN) signal, a chirp signal, or a hybrid signal including a PN sequence and a chirp signal.

18. A method for characterizing a multi-path signal transmission in transmitting a plurality of HDTV signals divided into a plurality of cyclic fields each including field synchronization signals and a vertical blanking period which further includes a plurality of horizontal scanning periods wherein said method comprising the steps of:
(a) transmitting periodically within a single vertical blanking period for one of said plurality of cyclic fields at least two reference signals each with a different predefined signal characteristic wherein each of said reference signals being transmitted in a different time duration defined by said horizontal scanning periods wherein each of said reference signals is either a pseudo-random noise (PN) signal, a chirp signal, or a hybrid signal including a PN sequence and a chirp signal;
(b) receiving said plurality of HDTV signals including said reference signals in said different horizontal blanking periods within said single vertical blanking period; and
(c) processing said received HDTV signals including said reference signals in said different horizontal blanking periods within said single vertical blanking period for detecting a multi-path channel delay of said signal transmission.

19. An apparatus for transmitting a plurality of HDTV signals divided into a plurality of cyclic fields each including field synchronization signals and a vertical blanking period which further includes a plurality of horizontal scanning periods wherein said apparatus including a channel characterization enabling means comprising:
a reference signal generating means for transmitting periodically within a single vertical blanking period for one of said plurality of cyclic fields at least two reference signals each with a different predefined signal characteristic wherein each of said reference signals being transmitted in a different time duration defined by said horizontal scanning periods and each of said reference signals is either a pseudo-random noise (PN) signal, a chirp signal, or a hybrid signal including a PN sequence and a chirp signal.

20. An apparatus for transmitting a plurality of signals divided into a plurality of cyclic fields each including field synchronization signals and a vertical blanking period which further includes a plurality of horizontal scanning periods wherein said apparatus including a channel characterization enabling means comprising:

a reference signal generating means for transmitting periodically within a single vertical blanking period for one of said plurality of cyclic fields at least two reference signals each with a different predefined signal characteristic wherein each of said reference signals being transmitted in a different time duration defined by said horizontal scanning periods.

21. An apparatus for receiving a plurality of signals divided into a plurality of cyclic fields each including field synchronization signals and a vertical blanking period which further includes a plurality of horizontal scanning periods wherein at least two of said horizontal scanning periods in a single vertical blanking period including two different reference signals wherein each of said reference signals being either a pseudo-random noise (PN) signal, a chirp signal, or a hybrid signal including a PN sequence and a chirp signal, said apparatus including a channel characterization means comprising:

a reference signal processing means for processing said received signals including said two different reference signals in said two horizontal scanning periods within said single vertical blanking period for performing a channel characterization.

22. An HDTV apparatus for receiving a plurality of HDTV signals divided into a plurality of cyclic fields each including field synchronization signals and a vertical blanking period which further includes a plurality of horizontal scanning periods wherein at least two of said horizontal scanning periods in a single vertical blanking period including two different reference signals wherein each of said reference signals being either a pseudo-random noise (PN) signal, a chirp signal, or a hybrid signal including a PN sequence and a chirp signal, said apparatus including a channel characterization means comprising:

a reference signal processing means for processing said received HDTV signals including said two different reference signals in said two horizontal scanning periods within said single vertical blanking period for performing a channel characterization.

* * * * *